United States Patent
Schmid et al.

(10) Patent No.: US 10,124,433 B2
(45) Date of Patent: Nov. 13, 2018

(54) METHOD AND DEVICE FOR CONNECTING THE ENDS OF STEEL TUBES BY MEANS OF ORBITAL WELDING USING A HYBRID TECHNIQUE

(75) Inventors: Christian Schmid, Seelze (DE); Simon Olschok, Aachen (DE); Claas Bruns, Düsseldorf (DE)

(73) Assignee: VALLOUREC DEUTSCHLAND GMBH, Düsseldorf (DE)

( * ) Notice: Subject to any disclaimer, the term of this patent is extended or adjusted under 35 U.S.C. 154(b) by 117 days.

(21) Appl. No.: 13/263,605

(22) PCT Filed: Mar. 31, 2010

(86) PCT No.: PCT/DE2010/000399
§ 371 (c)(1),
(2), (4) Date: Jan. 19, 2012

(87) PCT Pub. No.: WO2010/115413
PCT Pub. Date: Oct. 14, 2010

(65) Prior Publication Data
US 2012/0187096 A1      Jul. 26, 2012

(30) Foreign Application Priority Data

Apr. 8, 2009  (DE) .................. 10 2009 017 711
May 5, 2009  (DE) .................. 10 2009 020 146

(51) Int. Cl.
*B23K 26/00* (2014.01)
*B23K 9/028* (2006.01)
(Continued)

(52) U.S. Cl.
CPC ........ *B23K 9/0286* (2013.01); *B23K 26/1429* (2013.01); *B23K 26/282* (2015.10);
(Continued)

(58) Field of Classification Search
CPC .... B23K 26/20; B23K 26/24; B23K 26/3206; B23K 2203/04; B23K 15/0046;
(Continued)

(56) References Cited

U.S. PATENT DOCUMENTS 2,832,000 A * 4/1958 Steele ............................ 314/69
2,981,824 A * 4/1961 Kitrell ...................... 219/125.11
(Continued)

FOREIGN PATENT DOCUMENTS

DE   10 2008 029 724 A1   1/2009
EP        0 852 984 A1    7/1998
(Continued)

OTHER PUBLICATIONS

Machine Translation of Description WO2005056230.*

*Primary Examiner* — Eric Stapleton
(74) *Attorney, Agent, or Firm* — Henry M. Feiereisen LLC

(57) ABSTRACT

The invention relates to a method for connecting the ends of steel tubes by means of orbital welding using a hybrid laser arc technique, with the tubes preferably having wall thicknesses ≥6 mm and more particularly ≥12 mm and diameters of preferably ≥150 mm, the ends of which tubes are connected by one or more welding passes, wherein the laser and arc welding heads as tools are guided over a guide ring fixedly arranged around a tube end in the region of the weld site during the welding and are displaced around the tube diameter. The invention also relates to a device for carrying out the method, wherein the laser and the arc welding heads are positioned separately on the guide ring and are moved over the tube circumference and controlled independently of one another during the welding process.

9 Claims, 1 Drawing Sheet

(51) Int. Cl.
  *B23K 28/02* (2014.01)
  *B23K 26/14* (2014.01)
  *B23K 26/282* (2014.01)
  *B23K 101/06* (2006.01)
  *B23K 103/04* (2006.01)

(52) U.S. Cl.
  CPC .......... *B23K 28/02* (2013.01); *B23K 2201/06* (2013.01); *B23K 2203/04* (2013.01)

(58) Field of Classification Search
  CPC .......... B23K 2201/006; B23K 2201/04; B23K 2201/06; B23K 2201/10
  USPC .................... 219/61, 121.64, 125.11, 125.12
  See application file for complete search history.

(56) References Cited

U.S. PATENT DOCUMENTS

| | | | |
|---|---|---|---|
| 3,025,386 A * | 3/1962 | MacHain et al. | 219/125.11 |
| 3,033,975 A * | 5/1962 | Thomas et al. | 219/125.11 |
| 3,035,147 A * | 5/1962 | Latter | 219/60 A |
| 3,035,156 A * | 5/1962 | Staley | 219/125.12 |
| 3,113,542 A * | 12/1963 | Zundel | 413/1 |
| 3,163,743 A * | 12/1964 | Wroth et al. | 219/137 R |
| 3,267,251 A * | 8/1966 | Anderson | 219/125.1 |
| 3,555,239 A * | 1/1971 | Kerth | 219/124.34 |
| 3,651,290 A * | 3/1972 | Durbin et al. | 200/61.45 R |
| 3,737,614 A * | 6/1973 | Paulange | 219/60 A |
| 3,777,115 A * | 12/1973 | Kazlauskas et al. | 219/124.34 |
| 3,838,244 A * | 9/1974 | Petrides et al. | 219/130.5 |
| 4,001,543 A * | 1/1977 | Bove et al. | 219/121.63 |
| 4,019,016 A * | 4/1977 | Friedman et al. | 219/125.12 |
| 4,029,932 A * | 6/1977 | Cook | 219/121.63 |
| 4,080,525 A * | 3/1978 | Gobetz | 219/121.63 |
| 4,081,651 A * | 3/1978 | Randolph et al. | 219/61 |
| 4,082,935 A * | 4/1978 | Lampietti et al. | 219/606 |
| 4,088,865 A * | 5/1978 | Peters et al. | 219/121.63 |
| 4,107,503 A * | 8/1978 | Koshiga et al. | 219/61 |
| 4,112,289 A * | 9/1978 | Mead et al. | 219/124.33 |
| 4,125,926 A * | 11/1978 | Gale et al. | 29/888.043 |
| 4,144,992 A * | 3/1979 | Omae et al. | 228/102 |
| 4,145,593 A * | 3/1979 | Merrick et al. | 219/60 A |
| 4,145,594 A * | 3/1979 | Koshiga et al. | 219/61 |
| 4,152,573 A * | 5/1979 | Saurin et al. | 219/121.63 |
| 4,163,886 A * | 8/1979 | Omae et al. | 219/60 A |
| 4,213,024 A * | 7/1980 | Costley | 219/61 |
| 4,278,868 A * | 7/1981 | Rudd et al. | 219/123 |
| 4,283,617 A * | 8/1981 | Merrick et al. | 219/125.1 |
| 4,328,416 A * | 5/1982 | Dudley et al. | 250/202 |
| 4,365,132 A * | 12/1982 | Kazlauskas et al. | 219/60 A |
| 4,372,474 A * | 2/1983 | Taff | 228/29 |
| 4,429,211 A * | 1/1984 | Carstens et al. | 219/121.63 |
| 4,431,902 A * | 2/1984 | Wallen | 219/125.12 |
| 4,455,471 A * | 6/1984 | Ecer et al. | 219/125.12 |
| 4,457,382 A * | 7/1984 | Tolanda | 173/184 |
| 4,469,929 A * | 9/1984 | Rosen et al. | 219/121.64 |
| 4,471,201 A * | 9/1984 | Hardy | 219/76.14 |
| 4,479,043 A * | 10/1984 | Hess et al. | 219/608 |
| 4,533,814 A * | 8/1985 | Ward | 219/121.64 |
| 4,559,430 A * | 12/1985 | Hayakawa | 219/61 |
| 4,576,323 A * | 3/1986 | Ohnishi | 228/29 |
| 4,577,087 A * | 3/1986 | Chadwick | 219/121.63 |
| 4,578,562 A * | 3/1986 | Lindstrom et al. | 219/125.1 |
| 4,591,294 A * | 5/1986 | Foulkes | 405/170 |
| 4,618,759 A * | 10/1986 | Muller et al. | 219/121.75 |
| 4,716,271 A * | 12/1987 | Hulsizer et al. | 219/125.11 |
| 4,788,412 A * | 11/1988 | Hori et al. | 219/137 PS |
| 4,803,334 A * | 2/1989 | Burke et al. | 219/121.64 |
| 4,827,099 A * | 5/1989 | Krebs et al. | 219/121.63 |
| 5,059,765 A * | 10/1991 | Laing | 219/125.11 |
| 5,083,009 A * | 1/1992 | Reiser et al. | 219/219 |
| 5,126,523 A * | 6/1992 | Rinaldi | 219/60 R |
| 5,140,123 A * | 8/1992 | Mitani | 219/61.2 |
| 5,148,000 A * | 9/1992 | Tews | 219/125.11 |
| 5,171,954 A * | 12/1992 | Rinaldi | 219/61 |
| 5,179,260 A * | 1/1993 | Kroehnert | 219/121.63 |
| 5,196,671 A * | 3/1993 | Kroehnert | 219/121.63 |
| 5,227,601 A * | 7/1993 | Black | 219/61 |
| 5,380,978 A * | 1/1995 | Pryor | 219/121.64 |
| 5,408,065 A * | 4/1995 | Campbell et al. | 219/121.6 |
| 5,444,206 A * | 8/1995 | Isshiki et al. | 219/121.63 |
| 5,498,849 A * | 3/1996 | Isshiki et al. | 219/121.64 |
| 5,532,452 A * | 7/1996 | Lechner et al. | 219/124.34 |
| 5,532,454 A * | 7/1996 | Kuhnen | 219/137 R |
| 5,572,102 A * | 11/1996 | Goodfellow et al. | 318/568.13 |
| 5,593,605 A * | 1/1997 | Jones | 219/121.63 |
| 5,601,735 A * | 2/1997 | Kawamoto et al. | 219/121.63 |
| 5,616,258 A * | 4/1997 | Dreizin et al. | 219/56.22 |
| 5,658,473 A * | 8/1997 | Ziemek | 219/121.64 |
| 5,750,955 A * | 5/1998 | Yoshino | 219/121.46 |
| 5,796,068 A * | 8/1998 | Jones | 219/121.63 |
| 5,796,069 A * | 8/1998 | Jones et al. | 219/121.64 |
| 5,864,111 A * | 1/1999 | Barefoot | 219/61 |
| 5,866,870 A * | 2/1999 | Walduck | 219/121.45 |
| 5,914,058 A * | 6/1999 | Sanders et al. | 219/121.45 |
| 5,932,123 A * | 8/1999 | Marhofer et al. | 219/130.01 |
| 5,944,248 A * | 8/1999 | Van Heuveln | 228/45 |
| 5,968,384 A * | 10/1999 | Willems | 219/125.1 |
| 5,986,236 A * | 11/1999 | Gainand et al. | 219/121.82 |
| 5,996,878 A * | 12/1999 | LaCount | 228/25 |
| 6,040,550 A * | 3/2000 | Chang | 219/121.63 |
| 6,046,431 A * | 4/2000 | Beattie | 219/124.34 |
| 6,118,093 A * | 9/2000 | Hong | 219/61 |
| 6,191,379 B1 * | 2/2001 | Offer et al. | 219/75 |
| 6,230,072 B1 * | 5/2001 | Powell et al. | 700/195 |
| 6,259,052 B1 * | 7/2001 | Ding et al. | 219/59.1 |
| 6,313,426 B2 * | 11/2001 | Belloni et al. | 219/61 |
| 6,403,918 B1 * | 6/2002 | Fields et al. | 219/121.64 |
| 6,403,921 B1 * | 6/2002 | Maeda et al. | 219/125.11 |
| 6,429,405 B2 * | 8/2002 | Belloni et al. | 219/124.34 |
| 6,455,803 B1 * | 9/2002 | Fields et al. | 219/121.63 |
| 6,492,618 B1 * | 12/2002 | Flood et al. | 219/125.11 |
| 6,536,644 B2 * | 3/2003 | Plow | 226/190 |
| 6,596,969 B1 * | 7/2003 | Sakurai et al. | 219/122 |
| 6,737,601 B1 * | 5/2004 | Kramer et al. | 219/61 |
| 6,818,857 B1 * | 11/2004 | Cho et al. | 219/121.64 |
| 6,840,433 B2 * | 1/2005 | Vermaat | 228/212 |
| 6,844,521 B2 * | 1/2005 | Staufer et al. | 219/121.63 |
| 6,939,083 B2 * | 9/2005 | Tosi et al. | 405/170 |
| 7,107,118 B2 * | 9/2006 | Orozco et al. | 700/166 |
| 7,114,881 B2 * | 10/2006 | Belloni et al. | 405/170 |
| 7,189,028 B1 * | 3/2007 | Signaroldi et al. | 405/166 |
| 7,540,401 B2 * | 6/2009 | Vermaat | 228/212 |
| 7,759,603 B2 * | 7/2010 | Aigner et al. | 219/121.63 |
| 7,780,065 B2 * | 8/2010 | Vermaat | 228/212 |
| 2001/0052511 A1 * | 12/2001 | Briand et al. | 219/61 |
| 2002/0012810 A1 * | 1/2002 | Osame et al. | 428/650 |
| 2002/0017509 A1 * | 2/2002 | Ishide et al. | 219/121.63 |
| 2002/0036189 A1 * | 3/2002 | Zennaf et al. | 219/121.63 |
| 2002/0088778 A1 * | 7/2002 | Chang | 219/121.63 |
| 2004/0026388 A1 * | 2/2004 | Staufer et al. | 219/121.78 |
| 2004/0188395 A1 * | 9/2004 | Stol et al. | 219/121.64 |
| 2004/0232130 A1 * | 11/2004 | Sonoda et al. | 219/137 R |
| 2005/0006355 A1 * | 1/2005 | De Dinechin et al. | 219/121.63 |
| 2005/0011868 A1 * | 1/2005 | Matile et al. | 219/121.64 |
| 2005/0035094 A1 * | 2/2005 | Titze et al. | 219/121.64 |
| 2005/0155960 A1 * | 7/2005 | Bonnet | 219/137 WM |
| 2005/0274697 A1 * | 12/2005 | Frohne et al. | 219/61 |
| 2005/0284853 A1 * | 12/2005 | Takahashi et al. | 219/130.4 |
| 2006/0207983 A1 * | 9/2006 | Myers et al. | 219/137 PS |
| 2007/0023403 A1 * | 2/2007 | Emiljanow | 219/121.64 |
| 2007/0045236 A1 * | 3/2007 | Streubel | 219/61 |
| 2007/0119829 A1 * | 5/2007 | Vietz et al. | 219/121.63 |
| 2007/0251927 A1 * | 11/2007 | Miessbacher et al. | 219/121.63 |
| 2008/0011720 A1 * | 1/2008 | Briand et al. | 219/61 |
| 2008/0245774 A1 * | 10/2008 | Kim et al. | 219/74 |
| 2009/0032504 A1 * | 2/2009 | Kamei | 219/121.64 |
| 2009/0050609 A1 * | 2/2009 | Berger et al. | 219/121.64 |
| 2009/0095720 A1 * | 4/2009 | Kamei | 219/121.64 |
| 2010/0206850 A1 * | 8/2010 | Keitel et al. | 219/61 |

(56) References Cited

U.S. PATENT DOCUMENTS

FOREIGN PATENT DOCUMENTS

| EP | 1 632 306 A1 | 3/2006 |
|---|---|---|
| WO | WO 2005/056230 A1 | 6/2005 |

* cited by examiner

METHOD AND DEVICE FOR CONNECTING THE ENDS OF STEEL TUBES BY MEANS OF ORBITAL WELDING USING A HYBRID TECHNIQUE

CROSS-REFERENCES TO RELATED APPLICATIONS

This application is the U.S. National Stage of International Application No. PCT/DE2010/000399, filed Mar. 31, 2010, which designated the United States and has been published as International Publication No. WO 2010/115413 and which claims the priorities of German Patent Applications, Serial Nos. 10 2009 017 711.6, filed Apr. 8, 2009, and 10 2009 020 146.7, filed May 5, 2009, pursuant to 35 U.S.C. 119(a)-(d).

BACKGROUND OF THE INVENTION

The invention relates to a method for connecting the ends of steel tubes by means of orbital welding using hybrid technique as well as to a device for carrying out the method.

The invention relates in particular to tubes, preferably with wall thicknesses of more than 6 mm, in particular more than 12 mm, and diameters of preferably more than 150 mm, which tubes are connected to one another to form pipelines using different welding processes, such as for example laser beam welding and arc welding using hybrid technique. The term tubes as used hereinafter is to be understood as relating to round tubes as well as also to hollow tubes with varying cross sections.

Laser beam welding of tubes is generally known and efforts have continuously been undertaken to significantly reduce the seam cross section in comparison to the conventional arc welding processes, such as manual arc welding or metal inert gas welding (MIG), and to shorten welding times through higher welding speeds so as to improve efficiency.

DE 10 2008 029 724 A1 discloses a method for connecting thick-walled metal workpieces by means of welding, wherein three weld regions are provided in which welding involves a combination of welding processes, that is laser beam welding, hybrid laser arc welding, and arc welding.

U.S. Pat. No. 6,191,379 B1 describes processes which also combine welding processes, that is laser welding and TIG welding.

WO 2005/056230 A1 discloses for example as state of the art the combination of a metal inert gas welding method with a laser arc welding process, the so-called hybrid laser MIG welding, which is characterized in that the arc and the laser beam are arranged at a defined distance relative to one another and a higher gap bridging capability compared to a pure laser beam welding process can be attained.

With the device described there tubes are welded in mobile use by orbital welding technique to form pipelines.

In such a hybrid laser process, the laser beam and the arc of the MIG welding process impact simultaneously upon the weld site so that tube connections can be manufactured with high efficiency. The production of welded connections between the tubes is realized in this method by a welding device which revolves around the tube using orbital technique with a combined laser MIG welding head.

This method takes into account only to a limited extent the particular demands of hybrid welding such as, e.g., the adjustability of the arc root in relation to the laser beam axis, i.e. a change in distance between laser welding head and MIG welding head in circumferential direction is not possible at least not during the welding process.

Further disadvantageous are the comparably high weight of the combined hybrid welding head and moved masses as well as the limited flexibility with respect to process control, especially the geometry parameters of the hybrid welding head.

To suit the welding parameters to the respective welding position is particularly complicated when hybrid laser MIG welding is involved because the combination of two processes results in a high number of adjustment options. This is especially true for the geometric arrangements of laser beam and MIG welding torch, as shown in the WO 2005/056230 A1.

It is of particular drawback that the geometric parameters of the hybrid welding process can be adjusted during the process only in a very complicated way, when direct adaptation of a MIG torch to a laser beam processing optics is involved.

Orbital welding with a hybrid laser MIG welding process has the further drawback that the hybrid welding head known from the WO 2005/056230 A1 is composed of single components, respectively, which are not suited to one another to interact in an optimum way.

The solutions known to date for technical implementation of the hybrid laser MIG welding are therefore constructively complex, limited as far as adjustment options of the process parameters are concerned, and are characterized by a high weight.

In summary, it is noted that the state of the art at this time is absent of any industrially applicable orbital guidance system that is tuned to the demands of the hybrid laser arc welding in an optimum manner.

The known combined hybrid welding heads are appropriate for this application only to a limited extent because they have a comparably high weight, are inflexible during the welding process with respect to adjustability or setting capability of the geometric parameter, and as a result of their dimensions fail to meet the demands in particular for offshore welding.

SUMMARY OF THE INVENTION

It is an object of the invention to provide a method for connecting the ends of tubes of steel by means of orbital welding using hybrid laser arc technique to overcome the described shortcomings. Furthermore, a device for carrying out the method should be made available.

According to one aspect of the invention this object is solved by a method for connecting the ends of steel tubes by means of orbital welding using hybrid laser arc technique, with the ends being connected with one or more welding passes, wherein the laser welding head and the arc welding head as tools are guided during welding over at least one guide ring arranged securely in the region of the weld site about a tube end, and are moved about the tube circumference, wherein the laser welding head and the arc welding head are positioned separately on the guide ring and during the welding process are moved over the tube circumference and controlled independently from one another.

According to another aspect of the invention this object is solved by a device, including at least one guide ring arranged about a tube end and including a trolley arranged on the guide ring for receiving the laser welding head and the arc welding head as welding tools, wherein the laser welding head and the arc welding head are arranged separately on a trolley which is movable and controllable on the guide ring.

According to the teaching of the invention, a method is applied in which the laser welding head and the arc welding head are positioned separately on the guide ring and independently from one another are moved over the tube circumference during the welding operation and controlled.

The laser beam and the arc are hereby operated in a defined geometric constellation either simultaneously or time-staggered and in a coordinated manner, with both individual processes influencing each other, e.g. within a common melting bath.

The movement of the laser beam and the MIG torch, required for producing the weld seam, is realized by the coordinated movement of two trolleys, of which one guides at least one laser beam optics and a further one guides at least a MIG torch. The trolleys are being controlled and moved independently from one another during the welding process so that the distance between laser beam and arc root can be modified during the process.

The selected arrangement provides a simple possibility to change the operating distance between laser beam and arc. Through integration of respective axes upon the trolleys for adjusting the two components laser beam optics and arc torch, any disposition of these components relative to one another is conceivable. Compared to a system with a combined hybrid welding head which is moved by a trolley, a significantly simpler and more versatile construction becomes possible.

In particular, it is possible to easily realize complex movement patterns, such as, e.g., a movement of only the laser beam in and around the spatial axes.

The invention renders possible the realization of significant improvements in quality of the welding outcome during orbital welding. Depending on the welding position, optimized geometric welding parameters can respectively be applied for the hybrid laser MIG welding. Welding strategies which, e.g., require oscillation or swinging motions of the arc or the laser beam also independently from one another, can easily be implemented in terms of construction, control, and programming.

The application of fiber-guided laser guidance has proven in particular beneficial as far as process configuration, such as, e.g., beam guidance, is concerned. In terms of optic systems transmitting as well as reflecting elements can be used.

The trolleys are arranged preferably on a frame in the form of a guide ring in surrounding relationship to the tubes being joined. Further trolleys may travel on the frame construction, with several trolleys arranged side-by-side being also possible when using respective guide systems so that through respective arrangement individual trolleys may also move past one another. What is unique is the fact that the trolleys can be moved independently from one another as far as direction and speed are concerned.

To reduce the overall height of the processing optics, ideally the application of an angular optics is used which realizes a 90° deflection via a focusing mirror. A solid-state laser (e.g. disk laser or fiber laser) with optical fiber and a conventional MIG power source can be used. The feed of the wire is possible, e.g., via a wire coil upon the trolley of the arc welding head or via a hose assembly.

All control and regulating functions are realized hereby by a superordinate control.

In addition to the tools required for the actual welding process, further tools or components necessary for the welding process, assisting the welding process or required for subsequent manufacturing steps can be guided by the trolleys. This may involve, e.g., a seam tracking system or measuring means for non-destructive quality control of the weld seam through seam measurement or fault detection.

Using a system that moves ahead of the welding process, the weld joint can be ascertained and the position of the following welding process can be controlled.

The weld seam can undergo a quality check using, e.g., optical systems.

Further possible are also processing steps such as, e.g., grinding of end craters using a tool mounted on a trolley.

When wall thicknesses are involved that cannot be welded in one pass, the filler layers are welded with one welding pass or several welding passes advantageously using hybrid laser MIG welding or MIG alone. In addition, it may be advantageous to oscillate the welding head or the welding heads during welding to ensure a reliable and flawless penetration of the weld flanks. The use of the pulsed arc technique may in some cases also be beneficial.

A manipulation of the laser beam may further be suitable for the laser welding process in order to increase penetration of the weld flanks and to prevent weld flaws.

It is emphasized that depending on the welding position, an optimum arrangement of the laser beam and the arc can be selected respectively in relation to one another so as to attain a high seam quality in all positions with high efficiency at the same time.

To produce the filler layers, further welding tools may be arranged on one or more trolleys, with the filler layers being produced simultaneously also during the hybrid welding.

The orbital welding system may be equipped with control loops which can have as manipulated variables arc parameters and laser beam parameters, such as, e.g., the laser output, and in particular also geometric parameters. Input variables involve in particular measuring values from the hybrid welding process.

According to a further advantageous configuration of the invention, the laser beam undergoes a rotational movement during welding about the center point of a focusing mirror independently from the MIG torch. This allows acceleration of the laser beam in and/or transversely to the advance direction for preventing possible weld seam flaws.

In summary, the method according to the invention and the corresponding device has the following features and advantages:

Several trolleys or carriages can be moved on a guide ring independently from one another.

Each carriage is able to receive a separate tool and/or execute a particular function.

Each carriage receives a MIG torch and a laser beam focusing optics. A hybrid laser MIG process is realized by positioning and guiding the two tools in relation to one another.

During processing, the distance between the respective tools can be modified.

A carriage receives an optic, tactile or electromagnetically operating system for seam tracking. An optic system may additionally serve as seam guidance of the seam measurement or quality control after welding.

Further carriages may receive e.g. a MIG torch for producing filler layers or a device for automated grinding of an end crater.

Flexible transformation of the hybrid laser MIG welding process to orbital welding.

Optimum parameters can be adjusted at any time in dependence of the welding position.

Weight-reduced structure through single systems that are suited to one another in an optimum manner.

High productivity as a result of timed overlap of different processing and/or test steps.

The MIG torch and the laser processing optics can be respectively adjusted via at least one axis (linear axis or rotation axis) independently from one another as far as their disposition relative to one another and to the workpiece is concerned. This adjustment may be implemented during the welding process.

The laser beam optics can be moved with a rotation axis which is arranged perpendicular on the weld seam plane.

The device or the guide frame is able to guide trolleys on one or more parallel tracks independently from one another. It is even possible in some cases to move the trolleys past one another.

A trolley placed ahead of the welding process can receive a tool for preheating the weld seam region. The preheat temperature can be controlled in dependence on measuring values and/or other process parameters (e.g. position welding torch on the circumference).

The focusing optics can be equipped with an optical system for monitoring the welding process and for determining process features for controlling the welding process in particular a movement of the optics e.g. for variation of the focal position and a matching of the laser output.

BRIEF DESCRIPTION OF THE DRAWING

Further features, advantages, and details of the invention are disclosed in the following description of the shown figures.

It is shown in:

FIG. 1 shows the principal configuration of the orbital welding device according to the invention for hybrid laser and arc welding of tubes.

DETAILED DESCRIPTION OF PREFERRED EMBODIMENTS

Figure 1:
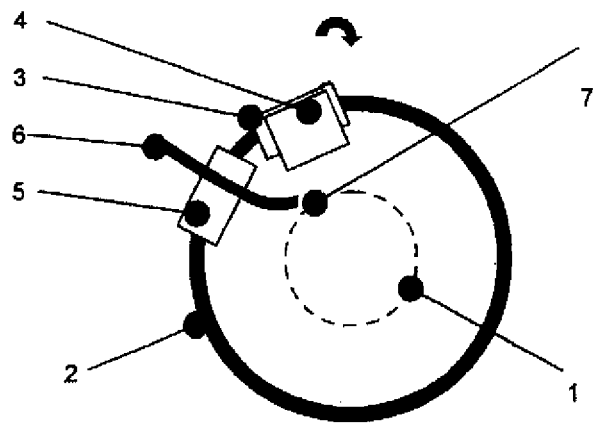
FIG. 1 the principal configuration of the orbital welding device according to the invention with separately movable laser welding head and arc welding head, FIG. 2 like FIG. 1, but with further separately movable tools.

The tubes 1 have ends to be welded which are centered by an internal centering device, not shown here, and prepared in this way for being welded together.

Arranged on the guide ring 2 which is configured as frame construction are a trolley 3 with a laser welding head 4 and a trolley 5 with an arc welding head 6 which can be moved and controlled independently from one another. Also not shown here are the power supply and the fluid supply of the welding heads as well as their control. The processing zone of the hybrid welding process on the tube 1 is designated with 7.

Each of the trolleys 3 and 5 is equipped with a direct drive, not shown here, by which the independent movement is rendered possible with the assistance of a single drive system. The parallel arrangement of further direct drives and guides basically permits also the option to allow the trolleys to move past one another. In the case at hand, both trolleys 3 and 5 travel clockwise (arrow direction) about the tube 1, with the laser welding head leading the way.

Figure 2:
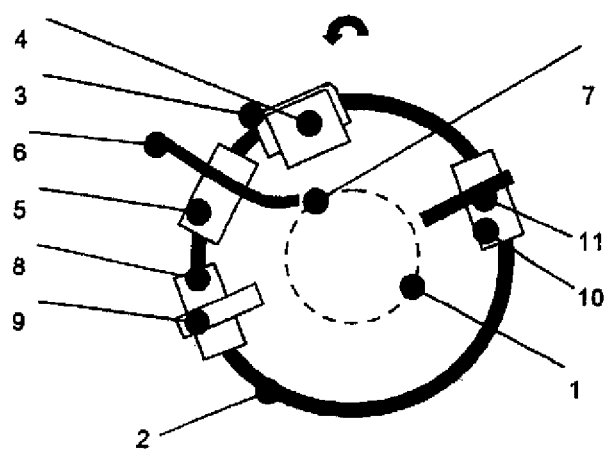

FIG. 2 shows a configuration in which additional tools are arranged on the guide frame. Same reference signs are used for same parts, with the following description centering only on the additional features of FIG. 2.

Selected for the illustration is an arc welding head 6 which leads the laser welding head 4 in counterclockwise direction. Installed on a trolley 8 ahead of the hybrid welding process and thus of the two trolleys 3 and 5 for the welding heads 4 and 5 is a seam tracking system 9 which can be utilized for quality control (e.g. photo documentation of the weld seam, automatic seam measurement, flaw detection) after the welding operation. Trailing the welding process is a further trolley 10 which is arranged on the guide ring 2 and has a further arc welding head 11 for producing filler layers. As an alternative, this could also be, e.g., a tool for automatic grinding of seam ends or a system for non-destructive testing of the weld seam so that a seam can be checked without changing the guide ring.

A compact structure permits an enclosure, not shown here, of the overall system for the purpose of laser safety.

The invention claimed is:

1. A method for connecting ends of steel tubes by means of orbital welding using hybrid laser arc technique, comprising:

providing said steel tubes displaying a wall thickness of at least more than 12 mm and diameters of at least more than 150 mm and being round or hollow tubes with varying cross sections;

providing a first trolley on a guide ring, said guide ring securely arranged in a region of a weld site about a circumference of at least one of the ends of the steel tubes, said first trolley carrying a laser welding head;

providing a second trolley on the guide ring separate from the first trolley, said second trolley carrying an arc welding head, said first and second trolley each having a respective motor for moving the first and second trolleys on the guide ring and thereby moving on the same guide ring at least two welding heads carrying out a hybrid welding process with at least two different welding processes including the laser welding head and the arc welding head, said respective motors being adjustable independent of each other so that with respect to the circumference of the at least one end of the steel tube an angular distance between a root of a laser beam of the laser head and an arc root of an electric arc generated by the arc welding head is variable during the orbital welding, said laser head having an angular optical fiber causing a 90° deflection via a focusing mirror;

connecting the ends of the steel tubes with one or more welding passes by moving the first and second trolleys independent of each other about the circumference, said first and second trolleys guided by the guide ring during said moving; and moving on the same guide ring a third trolley carrying a further arc welding head for producing filler layers.

2. The method of claim 1, further comprising separately adjusting a speed at which the laser welding head and the arc welding head are moved during said moving and a distance between the laser welding head and the arc welding head.

3. The method of claim 1, further comprising preheating a welding seam region before commencement of the welding process by a preheating device which travels ahead of the laser welding head and the arc welding head.

4. The method of claim 3, wherein the preheating device travels on the guide ring independently from the laser welding head and the arc welding head.

5. The method of claim 1, further comprising moving further tools on the guide ring independently from one another during welding.

6. The method of claim 5, wherein one or more additional said welding head, a seam tracking system, a mechanical processing system of the weld seam and/or a system for non-destructive testing of the weld seam are used as further tools.

7. The method of claim 1, wherein the tools move on several guide rings arranged on one tube end or both tube ends.

8. The method of claim 1, wherein the metal inert gas welding (MIG) is used as arc welding process.

9. The method of claim 8, wherein the MIG welding is carried out using pulsed arc technique.

\* \* \* \* \*